United States Patent [19]

Wicklund

[11] Patent Number: 5,191,934
[45] Date of Patent: Mar. 9, 1993

[54] PORTABLE TIRE BEAD BREAKER APPARATUS

[76] Inventor: Dale L. Wicklund, P.O. Box 431, Deer River, Minn. 56636

[21] Appl. No.: 889,483

[22] Filed: May 27, 1992

[51] Int. Cl.$^5$ .............................................. B60C 25/06
[52] U.S. Cl. .................................... 157/1.17; 157/1.3; 157/1.2
[58] Field of Search .................. 157/1.0, 1.1, 1.17, 157/1.2, 1.3, 1.26, 1.28

[56] References Cited

U.S. PATENT DOCUMENTS

| | | |
|---|---|---|
| 1,475,519 | 11/1923 | Snider . |
| 2,619,158 | 11/1952 | Kohn ................................ 157/1.17 |
| 2,873,795 | 2/1959 | Kleparchuk ...................... 157/1.17 |
| 4,524,813 | 6/1985 | Gering ............................... 157/1.17 |
| 4,800,943 | 1/1989 | Umemoto et al. ................. 157/1.17 |

Primary Examiner—D. S. Meislin
Attorney, Agent, or Firm—Merchant, Gould, Smith, Edell, Welter & Schmidt

[57] ABSTRACT

A portable apparatus is provided for dislodging a tire bead from the bead seat of a wheel rim of a vehicle. The apparatus includes a pair of telescoping tubes (12, 14) which carry wheel rim engaging clamps (16, 18) at opposing outer ends of the tubes. The telescoping tubes are fixedly adjustable which allows the clamps to engage diametrically opposite portions of the wheel rim and to be tightened in place. A bead breaker foot (26) is carried at the outer end of tube (12) adjacent to engaging clamp (16). The breaker foot is movable and can be adjusted downwardly to break the tire away from the wheel rim.

20 Claims, 3 Drawing Sheets

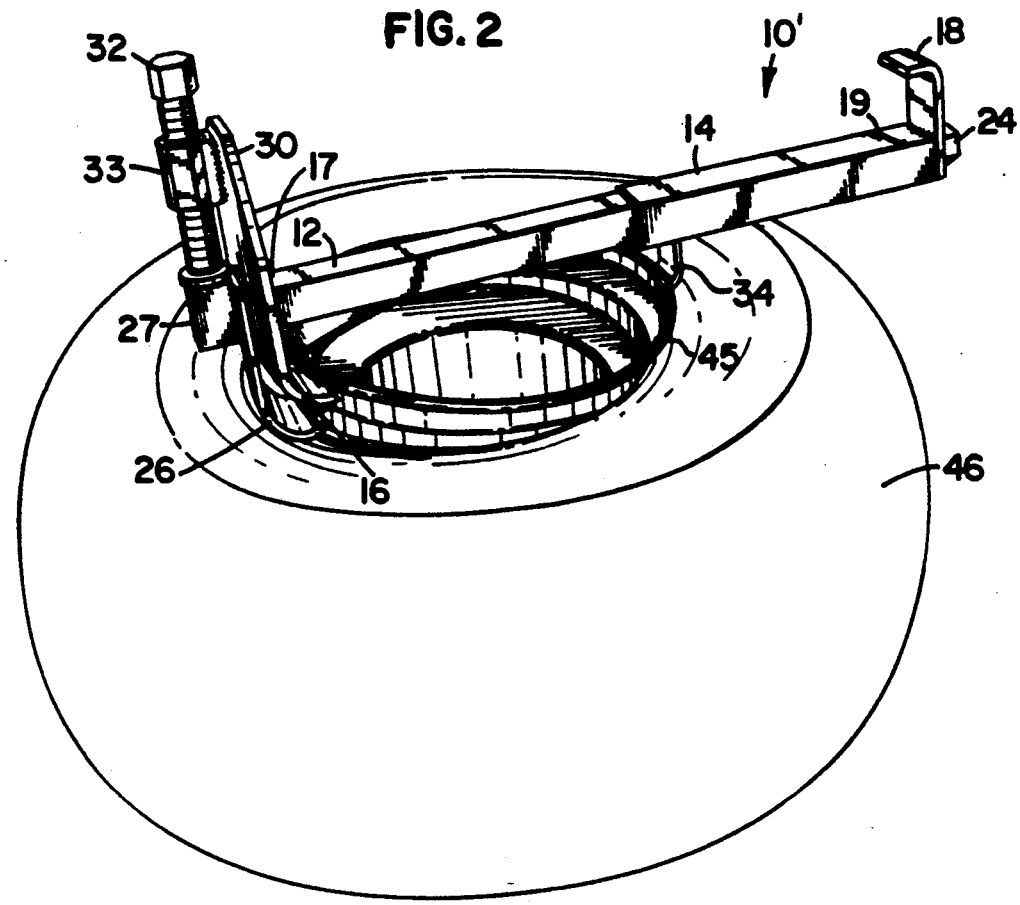
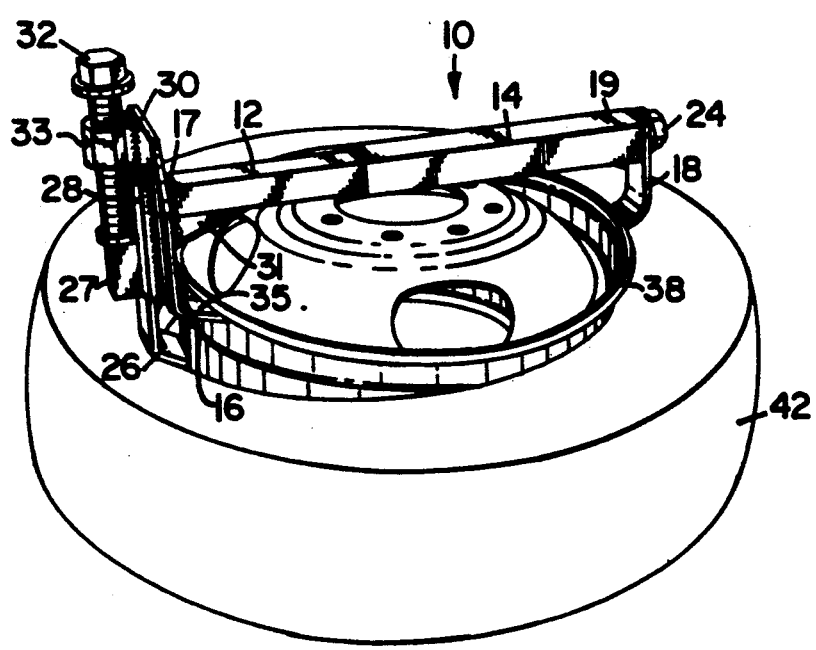

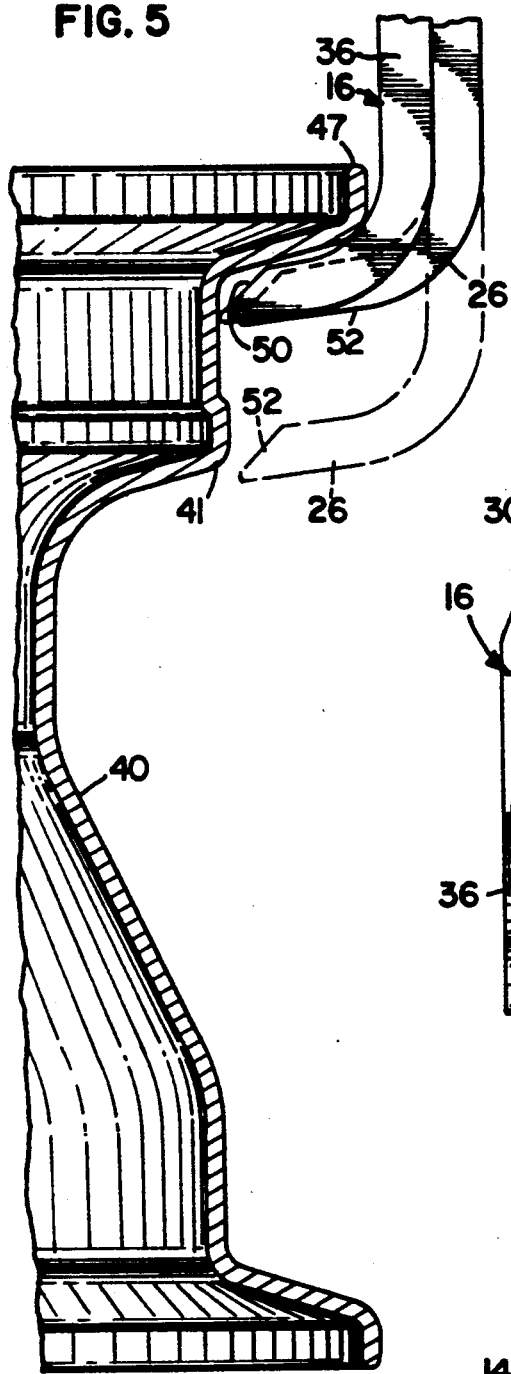
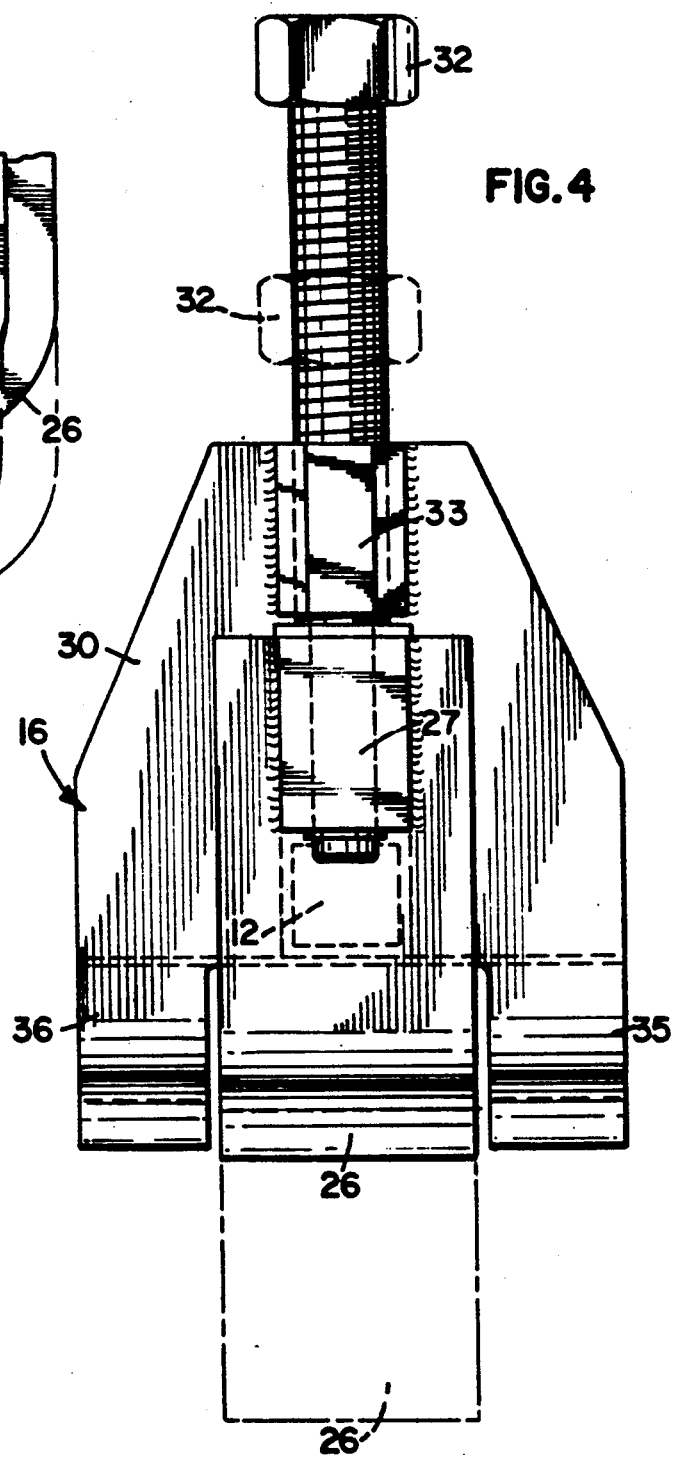
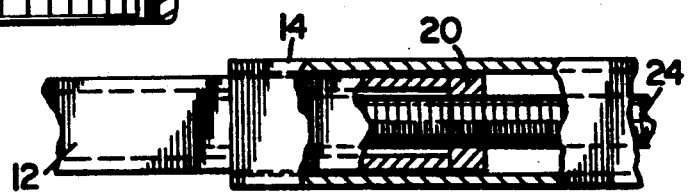

PORTABLE TIRE BEAD BREAKER APPARATUS

FIELD OF THE INVENTION

The invention relates to tire removing devices, and more particularly to an improved portable tire bead dislodging apparatus which breaks a tire away from a vehicular wheel rim.

BACKGROUND OF THE INVENTION

In order to remove a tire from the wheel of a vehicle, it is necessary to dislodge or "break" the bead of the tire away from the bead seat of a wheel rim. A variety of devices for removing vehicular tires from wheel rims have been developed previously.

For example, Umemoto et al., U.S. Pat. No. 4,800,943 discloses a tire bead dislodging device which has slidable rim clamps and a screw rod to make adjustments to the diameter. A screw actuated breaker foot is moved downward by a handle and the breaker foot pushes down on the tire bead to remove the tire from the rim. Kohn, U.S. Pat. No. 2,619,158 discloses a tire bead tool which has a pair of wheel rim engaging clamps with one of the clamps slidable along a bar, and a breaker foot which is lever actuated.

Other examples of tire bead breaker devices include Snider, U.S. Pat. No. 1,475,519, which discloses a bead breaker with a single rim clamp and a screw actuated breaker foot. Gering, U.S. Pat. No. 4,524,813 discloses a tire bead breaking tool which includes a holddown bar that is clamped to the wheel rim. The holddown bar includes a tire press having a tongue which is inserted between the tire bead and the wheel rim, and the tire press is screw actuated by use of a rotatable crank arm.

While the above devices provide some assistance in removing a tire from a wheel rim, there is a need for a portable tire bead breaking device which is easy, safe and simple to use, and which can be used on a variety of different sized tires.

SUMMARY OF THE INVENTION

The present invention is directed to a tire bead breaker apparatus that can be utilized to unseal or break the bead of a tire away from the bead seat of a vehicular wheel rim. The tire bead breaker apparatus comprises a first tube which is telescopically engaged with a second tube, a first clamp attached to the first tube at an outer end thereof, and a second clamp attached to the second tube at an opposing end to the first tube outer end. A breaker foot is carried at the first tube outer end adjacent to the first clamp, and the breaker foot is movable in a perpendicular direction to the first and second tubes for pushing down upon the bead of a tire mounted on a wheel rim. The breaker foot will clear the rib of a safety wheel when the foot is pushed against the tire bead.

The apparatus further comprises a means for removably engaging the first and second clamps with a wheel rim. The engaging means preferably comprises a threaded nut carried by the first tube, and a rotatable threaded rod disposed within the second tube which is operatively engaged with the threaded nut. This threaded rod and nut arrangement allows the clamps on the tubes to be adjusted by movement of the tubes to engage diametrically opposite portions of the wheel rim and to be tightened in place. Once the clamps are attached to the rim and tightened, no further adjustments are needed.

The apparatus of the invention can further comprise an upstanding power screw which is adjacent to the first tube outer end. The breaker foot is preferably attached to the power screw at a lower end thereof so that the breaker foot is screw activated and can be moved downwardly to break the tire away from the wheel rim. The power screw is preferably threaded vertically through a nut attached to a face plate disposed at the outer end of the first tube. In one preferred embodiment of the invention, the breaker foot is displaceable by action of the upstanding power screw for pushing down upon a tire bead in an axial direction relative to a wheel rim axis while the clamps engage an outer surface of the wheel rim.

In an alternative embodiment, the apparatus of the invention can further comprise a third clamp attached to the second tube at an opposite end and side from the second clamp. The third clamp is attached to the second tube so that the present device can be used to remove even the smallest tires from wheel rims. Thus, the present invention is a much more universal tool for removing a variety of different sized tires from various wheel rims than prior tire bead breaking devices. Furthermore, the present invention is much more simply constructed than prior tire bead breaking devices.

One aspect of the present invention is the novel tire bead breaker apparatus. A further aspect of the invention is a method of using the tire bead breaker apparatus for removing tires from wheel rims.

One object of the present invention is to provide a tire bead dislodging apparatus which is readily portable and easy to set on a tire and by which the bead of the tire can be easily and reliably dislodged from its wheel rim bead seat without causing damage to the wheel rim. To the accomplishment of the above, and to such other objects as may hereinafter appear, the present invention is defined in the appended claims and described in the specification taken together with the accompanying drawings.

BRIEF DESCRIPTION OF THE DRAWINGS

FIG. 1 is a front elevational perspective view of one embodiment of the tire bead breaker apparatus of the invention which has been attached to a raised center wheel of a one ton truck.

FIG. 2 is a front elevational perspective view of another embodiment of the invention which has been attached to a small wheel.

FIG. 4 is a rear elevational view of the apparatus shown in FIG. 3.

FIG. 5 is a fragmentary closeup view showing how the apparatus shown in FIG. 3 is attached to a wheel rim.

FIG. 6 is a side elevational fragmentary view partly broken away of the apparatus shown in FIG. 1.

DETAILED DESCRIPTION OF THE INVENTION

Figure 3:
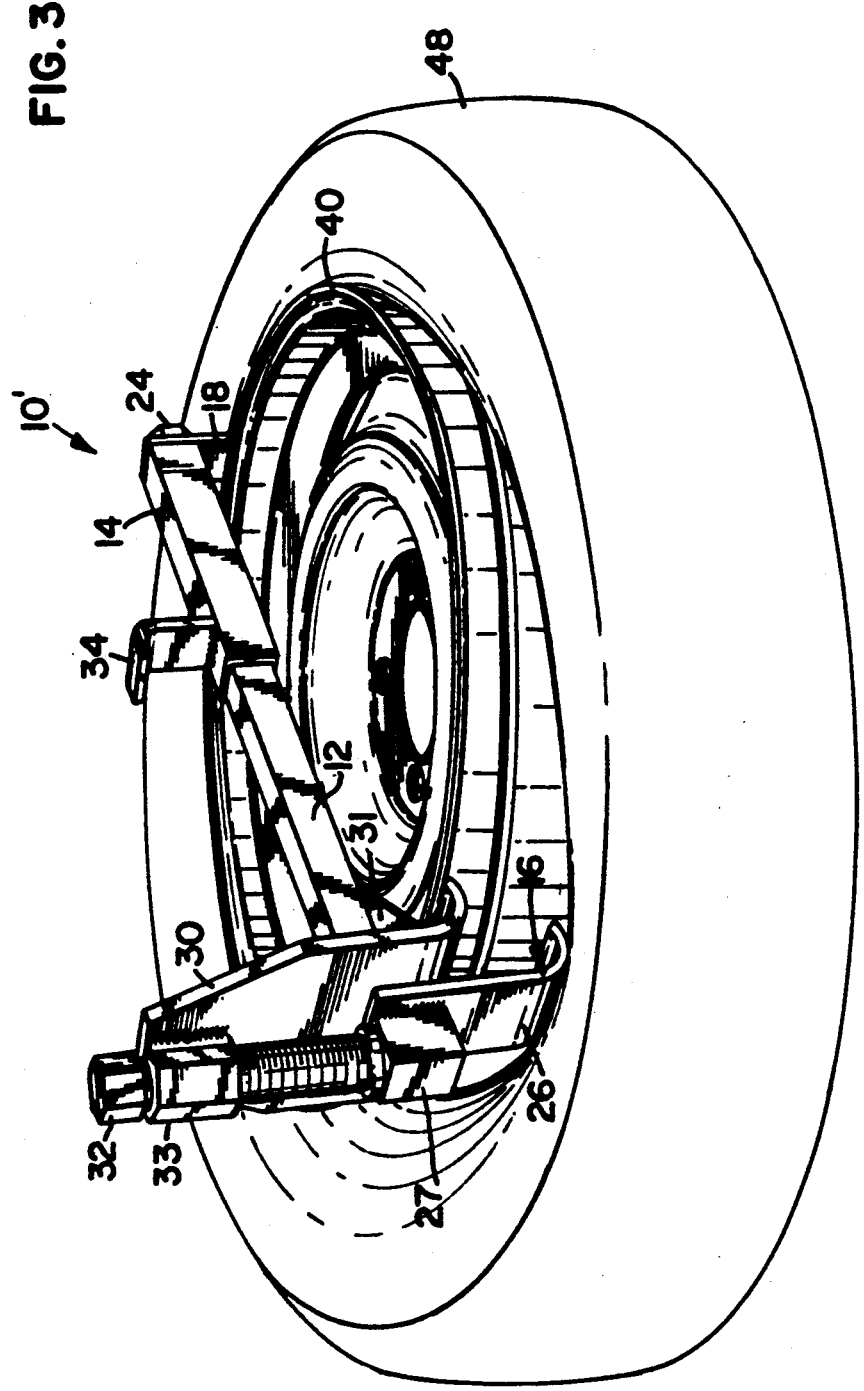
FIG. 3 is a front elevational perspective view of the apparatus shown in FIG. 2 attached to a pick-up truck wheel.

The invention is directed to a portable device which is a tire bead breaker apparatus that can be used to unseal or "break" the bead of a tire from the bead seat of a wheel rim of a vehicle. The tire bead breaker comprises a pair of telescoping tubes which carry wheel rim engaging clamps on their outer ends. The clamps can engage diametrically opposite portions of the wheel rim and can be tightened in place. A bead breaker foot is carried at the outer end of one of the tubes adjacent to that tube's wheel rim engaging clamp. The breaker foot is preferably screw activated and can be moved downwardly to break the tire away from the wheel rim.

The drawings depict various preferred embodiments of the invention which can be formed in a variety of ways. While the description will proceed with respect to such drawings, it will be readily understood by those skilled in the art that such description and drawings are used to explain the novel features of this invention, rather than in any limiting sense.

Referring to FIG. 1 of the accompanying drawings, a first preferred embodiment of the tire bead breaker apparatus of the present invention is depicted therein. The apparatus 10 is shown attached to wheel rim 38 of a one ton truck wheel with raised center and tire 42. Apparatus 10 includes a first tube 12 which is telescopically engaged with a second tube 14. Wheel rim engaging clamp 16 is rigidly attached (e.g., welded) to tube 12 at outer end 17, and engaging clamp 18 is rigidly attached to tube 14 at opposing outer end 19. Clamp 16 and tube 12 are rigidly attached to face plate 30 and support plate 31. Preferably, clamp 16 is contiguous with face plate 30, and clamp 16 has a pair of spaced apart clamp members 35 and 36 (see FIG. 4).

A bead breaker foot 26 is carried at outer end 17 of tube 12 adjacent engaging clamp 16, and breaker foot 26 is rigidly attached to sleeve 27. Sleeve 27 is engaged with one end of upstanding power screw 32 which is adjacent to face plate 30 at outer end 17 of tube 12. Optionally, guide member 28 is attached to the outer side of face plate 30 adjacent to sleeve 27. Power screw 32 is rotatively engaged with nut 33 which is attached to the outer side of face plate 30. Screw 32 can be turned by way of a wrench or a T-handle (not shown) to move the breaker foot 26 downward (see FIG. 4) and thereby force the tire bead away from the wheel rim, enabling the removal of a flat or worn tire. As seen in FIG. 4, when power screw 32 is in a raised position, breaker foot 26 is disposed between clamp members 35 and 36.

The apparatus 10 further comprises a means for removably engaging clamps 16 and 18 with a wheel rim. As seen in FIG. 6, the engaging means can include a threaded nut 20 carried by tube 12 and a rotatable threaded rod disposed within tube 14 which is operatively engaged with threaded nut 20. This arrangement provides the mechanism for fixedly adjusting the length of telescoping tubes 12 and 14, which in turn adjusts clamps 16 and 18 to engage diametrically opposite portions of wheel rim 40 and to be tightened in place.

Another preferred embodiment of the apparatus of the invention is depicted in FIGS. 2 and 3. In apparatus 10', an additional engaging clamp 34 is rigidly attached to tube 14 on the opposite side and end from where clamp 18 is located. This arrangement allows apparatus 10' to be used to remove tires from small vehicular wheels as well as from larger wheels. FIG. 2 shows apparatus 10' attached to a small wheel rim 45 having tire 46 (e.g., an All Terrain Vehicle (A.T.V.) wheel) utilizing clamp 34. To use apparatus 10' having clamp 34 on a larger wheel, tube 14 is removed from tube 12, and tube 14 is then rotated one-half turn and replaced back on tube 12. This arrangement is depicted in FIG. 3, which shows apparatus 10' attached to a larger wheel rim 40 having tire 48 (e.g., a pick-up truck wheel) utilizing clamp 18, after the above procedure has taken place. The present invention is thus a much more universal tool for removing a variety of different sized tires from various wheel rims than prior tire removing devices.

The present invention is also suitable for removing tires from safety wheels which are designed to prevent a tire which goes flat from leaving the wheel rim while the vehicle is in motion. Referring to FIG. 5, a fragmentary view in cross-section of a safety wheel rim 40 is depicted having safety rib 41 and bead seat 47. A partial close-up view of clamp 16 and breaker foot 26 is shown engaged with wheel rim 40. As can be seen in FIG. 5, foot member 52 of breaker foot 26 is shorter than foot member 50 of clamp 16. This arrangement allows breaker foot 26 to clear (shown in phantom view) and not to catch on safety rib 41 as breaker foot 26 is moved downwardly against the tire bead. Thus, once the breaker foot 26 is set on the wheel, no further adjustments are needed before moving the breaker foot 26 against the tire bead.

The present tire bead breaker apparatus is preferably of an all steel construction. The various components of the invention are preferably securely or rigidly attached together such as by welding.

To operate the apparatus of the invention, the valve core of a tire is first removed, and the tire is placed on the floor or ground. The clamps 16, 18 (or 34) are adjusted to fit over the wheel rim and while holding the apparatus down with a foot, the clamps are tightened to the wheel rim such as by using a deep socket and ratchet to turn the screw rod 24 located inside tube 14. Liquid soap can be used to help the clamps slide on the tire if necessary. The upstanding power screw 32 is then turned (e.g., by using a socket and ratchet), thereby moving the breaker foot 26 against the tire bead. As screw 32 is progressively urged downward, the tire is pushed away from the wheel rim. If the wheel rim is extremely rusty, the breaker apparatus can be loosened and rotated four to six inches and the above procedure repeated.

The present invention has many advantages over prior tire removing devices. The present apparatus is much more simply constructed than prior bead breaking devices. The wheel engaging clamps are rigidly attached on the telescoping tubes and the clamps are secured to the wheel rim by telescopic movement of the tubes through the threaded rod and nut arrangement in the tubes. Once the clamps are attached to the wheel rim, no further adjustments are needed. The face plate clamp (16) and breaker foot are pulled into place on the wheel rim and tire simultaneously by the telescopic movement of the tubes having the threaded rod arrangement which can be turned with a wrench. By using this arrangement in the tubes, enough force can be used to pull the wheel clamps into engagement with the wheel rim even on heavy-wall tires. Furthermore, the breaker foot is designed so as not to catch on the safety rib of safety wheels, as the power screw (32) is turned downwardly to push the tire off a wheel rim.

The apparatus of the invention clamps to a wheel without damaging it by using a simple socket wrench, electric wrench, air wrench or any hand-held wrench. The invention can be used to remove tires from the wheels of a wide variety of different vehicles having different tire sizes, including A.T.V.'s, lawn tractors, golf carts, cars, light trucks, trailers, farm equipment, etc. By utilizing longer wheel clamps, the present invention will work on wide balloon tires or "mudders", along with classic "Model A" wheels, and all dual wheels with raised centers such as used in motorhomes, trucks, etc. The apparatus of the invention can be preferably used to change the tires on 4 inch wheels up to 20 inch wheels.

The apparatus of the invention allows anyone to replace their own tires in a safe, easy, and convenient manner. Since the present device is portable, it may be used easily at home or on the road.

The foregoing discussion is illustrative of the invention. However, since many embodiments of the invention can be made without departing from the spirit and scope of the invention, the invention resides wholly in the claims hereinafter appended.

I claim:

1. A tire bead breaker apparatus, comprising:
   (a) a first tube having an outer end;
   (b) a second tube telescopically engaged with said first tube, said second tube having an opposing end to said first tube outer end;
   (c) a first clamp attached to said first tube at said outer end thereof;
   (d) a second clamp attached to said second tube at said opposing end thereof;
   (e) an upstanding power screw cooperatively disposed on said first tube outer end, said screw threaded vertically through a nut attached to a face plate disposed on said first tube outer end; and
   (f) a breaker foot operatively attached to said screw at a lower end thereof adjacent to said first clamp; wherein said breaker foot is displaceable in a perpendicular direction to said first and second tubes by movement of said power screw for pushing down upon a bead of a tire mounted on a wheel rim.

2. The apparatus of claim 1 wherein said first clamp comprises a pair of spaced apart clamp members.

3. The apparatus of claim 2 wherein said breaker foot can extend between said pair of clamp members.

4. The apparatus of claim 3 wherein said breaker foot is displaceable by rotation of said upstanding power screw for pushing down upon a tire bead in an axial direction relative to a wheel rim axis while said first and second clamps engage and outer surface of the wheel rim.

5. The apparatus of claim 4 further comprising a means for removably engaging said first and second clamps with said wheel rim.

6. The apparatus of claim 5 wherein said engaging means comprises a threaded nut carried by said first tube, and a rotatable threaded rod disposed within said second tube which is operatively engaged with said threaded nut.

7. The apparatus of claim 1 wherein said apparatus is made of steel.

8. The apparatus of claim 1 further comprising a third clamp attached to said second tube at an opposite end and side from said second clamp.

9. The apparatus of claim 8 wherein said clamps are rigidly attached to said first and second tubes.

10. The apparatus of claim 1 wherein said breaker foot will clear the rib of a safety wheel when said foot is pushed against a tire bead.

11. A method of removing a tire from a vehicular wheel rim using the tire bead breaker apparatus of claim 1, comprising the steps of:
   (a) engaging said first and second clamps with the wheel rim at diametrically opposite positioned on the rim;
   (b) contacting said breaker foot with the tire bead; and
   (c) pushing said breaker foot downwardly against the tire bead to break the tire away from the rim.

12. A tire bead breaker apparatus, comprising:
   (a) a first tube having an outer end;
   (b) a first threaded nut disposed on said first tube;
   (c) a second tube telescopically engaged with said first tube, said second tube having an opposing end to said first tube outer end;
   (d) a rotatable threaded rod disposed within said second tube which is operatively engaged with said first threaded nut;
   (e) a first clamp rigidly attached to said first tube at said outer end thereof;
   (f) a second clamp rigidly attached to said second tube at said opposing end thereof;
   (g) a face plate disposed on said first tube outer end;
   (h) a second threaded nut attached to said face plate;
   (i) an upstanding power screw threaded vertically through said second threaded nut; and
   (j) a breaker foot operatively attached to said screw at a lower end thereof adjacent to said first clamp; wherein said breaker foot is displaceable in a perpendicular direction to said first and second tubes by movement of said upstanding power screw for pushing down upon a tire bead in an axial direction relative to a wheel rim axis while said first and second clamps engage an outer surface of the wheel rim.

13. The apparatus of claim 12 wherein said first clamp comprises a pair of spaced apart clamp members.

14. The apparatus of claim 13 wherein said breaker foot can extend between said pair of clamp members.

15. The apparatus of claim 12 wherein said apparatus is made of steel.

16. The apparatus of claim 12 further comprising a third clamp rigidly attached to said second tube at an opposite end and side from said second clamp.

17. The apparatus of claim 12 wherein said breaker foot will clear the rib of a safety wheel when said foot is pushed against a tire bead.

18. A tire bead breaker apparatus, comprising:
   (a) a first tube having an outer end;
   (b) a second tube telescopically engaged with said first tube, said second tube having an opposing end to said first tube outer end;
   (c) a first clamp attached to said first tube at said outer end thereof;
   (d) a second clamp attached to said second tube at said opposing end thereof;
   (e) a third clamp attached to said second tube at an opposite end and side from said second clamp; and
   (f) a breaker foot operatively disposed on said first tube outer end adjacent to said first clamp; wherein said breaker foot is displaceable in a perpendicular direction to said first and said second tubes for pushing down upon a bead of a tire mounted on a wheel rim.

19. The apparatus of claim 18 wherein said clamps are rigidly attached to said first and second tubes.

20. A tire bead breaker apparatus comprising:
   (a) a first tube having an outer end;
   (b) a threaded nut disposed on said first tube;
   (c) a second tube telescopically engaged with said first tube, said second tube having an opposing end to said first tube outer end;
   (d) a rotatable threaded rod disposed within said second tube which is operatively engaged with said threaded nut;

(e) a first clamp rigidly attached to said first tube at said outer end thereof;

(f) a second clamp rigidly attached to said second tube at said opposing end thereof; and (g) a third clamp rigidly attached to said second tube at an opposite end and side from said second clamp;

(h) an upstanding power screw disposed on said first tube outer end; and (i) a breaker foot operatively attached to said screw at a lower end thereof adjacent to said first clamp;

wherein said breaker foot is displaceable in a perpendicular direction of said first and second tubes by movement of said power screw for pushing down upon a tire bead in an axial direction relative to a wheel rim axis while said first and second clamps engage an outer surface of the wheel rim.

* * * * *